United States Patent Office 3,522,711
Patented Aug. 4, 1970

3,522,711
CAPACITY CONTROLLER FOR LIQUID CHILLER
William J. Shaughnessy, Bridgewater Township, N.J., assignor to American Standard Inc., New York, N.Y., a corporation of Delaware
Filed July 16, 1968, Ser. No. 745,258
Int. Cl. F25b *41/00*
U.S. Cl. 62—196                                                19 Claims

ABSTRACT OF THE DISCLOSURE

This invention relates to refrigerating systems or chilling systems for controlling the temperature of fluid, such as water, which is used to air-condition a building. The invention is particularly concerned with electronic or solid state circuit arrangements for regulating the operation of the refrigerating or chilling system. The arrangements perform the control functions without unduly stressing any of the components of the system.

---

Figure 1:
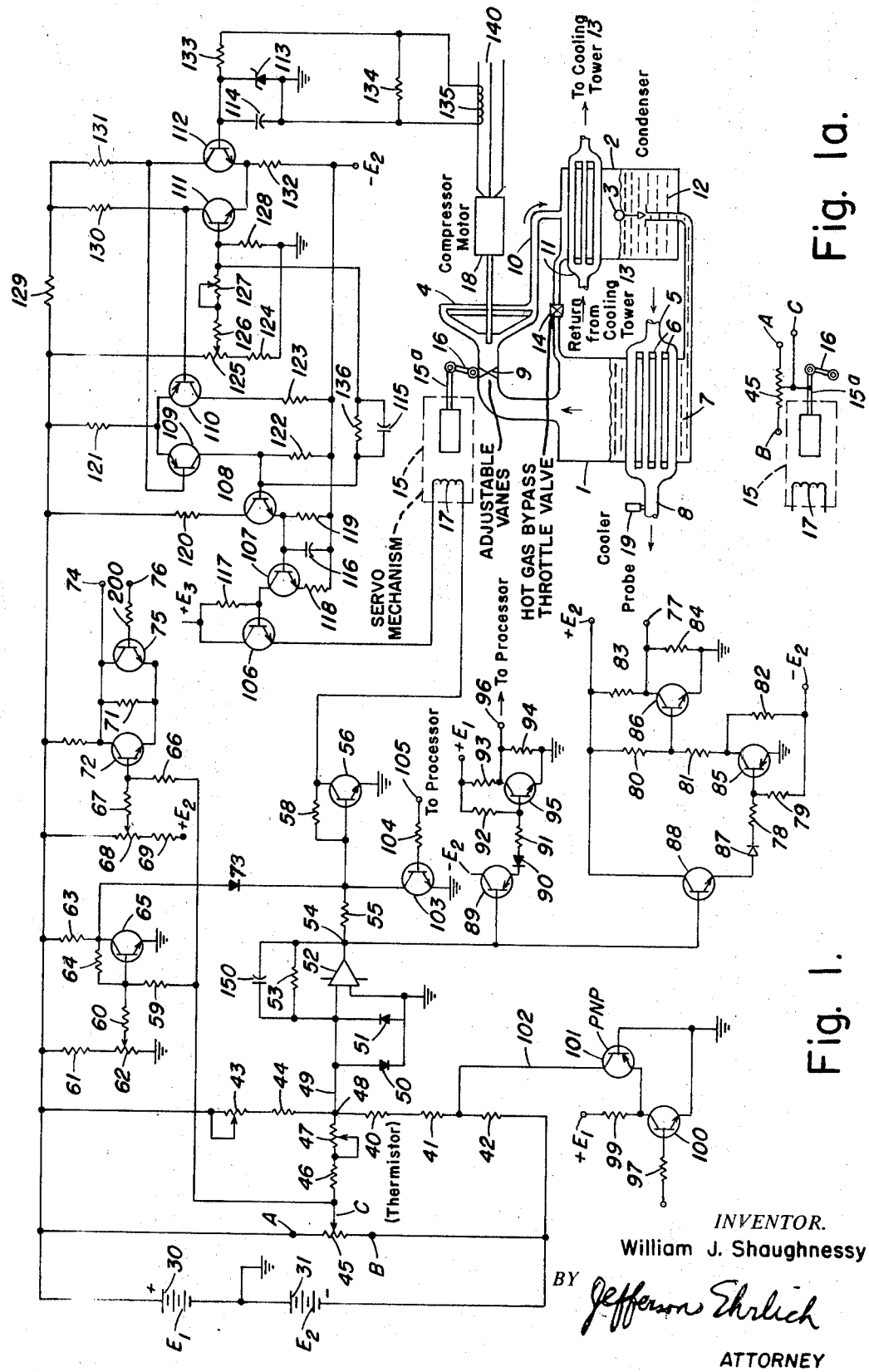

This invention relates to electronic control circuitry and systems and, more particularly, it relates to control systems for refrigeration and air-conditioning machines or systems and for liquid chilling machines and systems. This invention relates especially to such machines, systems or products which are employed to remove heat from, or to cool, circulating liquids such as water. This invention involves control apparatus which is applicable to such machines, systems or products which are suitable for cooling large buildings, such as office buildings, apartment houses, motels, etc. This invention is also applicable to apparatus for the control of industrial machines, systems or products for use in manufacturing processes which may require large volumes of liquids, such as water, to carry out cooling operations in such processes.

GENERAL APPARATUS TO WHICH THE INVENTION RELATES

In a refrigerating system employed, for example, to provide chilled water for the air-conditioning or cooling of a large building, it is often customary to employ a refrigerating machine to supply chilled water to the building to perform the usual cooling functions and to return to the refrigerating machine the same water after it has been raised in temperature on account of the absorption of heat from the building in air-conditioning or cooling the building. The returned liquid, which may be called the influent liquid, will be fed to an evaporator where it will be transmitted in tandem through a series of tubes which are surrounded by a refrigerant of any well known chemical composition. The refrigerant will undergo a transition in the evaporator from a liquid state to a gaseous state in response to the rise in the temperature of the refrigerant incurred due to its cooling action on the influent liquid. The chilled liquid will be re-fed to the building for another or repeated air-conditioning operation. However, the gaseous refrigerant will be fed to adjustable vanes serving as a throttle valve to throttle the gas refrigerant in accordance with the building's required refrigeration load. A compressor, which may be a single stage rotary compressor, will be employed to elevate the pressure of the gas refrigerant, and the higher pressure gas refrigerant will be fed by the impeller of the compressor to a condenser. In the process of compression in the condenser, the temperature of the gas refrigerant will be raised and the raised temperature of the gas will serve to elevate the temperature of a fluid, such as water, being circulated through a series of tandem-connected tubes in the condenser which feed the fluid to a cooling tower, for example. The cooling tower, employing a moving air stream as a cooling medium, will extract heat from the circulating fluid of the condenser and return cooled fluid for repeated or cyclical cooling operations in the condenser.

The high pressure of the gas refrigerant fed to the condenser by the compressor causes the gas to be converted into a liquid state as heat is removed from the gas to lower its temperature. The condensing and cooled gas refrigerant is collected in the sump of the condenser and is then fed through another throttling valve to the evaporator for further cooling action. Here the liquid refrigerant in the evaporator again absorbs heat from influent liquid, such as water, which has been returned from the building which is being air-conditioned.

The cycle of operations just outlined will be repeated again and again under control of apparatus which will be described in connection with this invention.

OBJECTS OF THE INVENTION

One of the objects of this invention is to provide improved apparatus and methods to control the cooling power or capacity of a chiller or an air-conditioning system.

Another of the objects of this invention is to provide solid state circuitry and apparatus for the control of the operation of a chiller or an air-conditioning system.

Another of the objects of this invention is to provide improved apparatus to regulate the temperature of a fluid, such as water, which is to be employed with a chiller or an air-conditioning system, by controlling the operation of a throttling mechanism of the chiller or air-conditioning system and thereby controlling also the cooling capacity of the chiller or air-conditioning system.

Another of the objects of this invention is to provide improved arrangements to change or adjust the cooling capacity of an air-conditioning system by controlling the operation of a so-called hot-gas bypass valve employed in the air-conditioning system.

Still another of the objects of this invention is to provide improved apparatus to control an air-conditioning system so that it may efficiently respond to temperature changes of the fluid, such as water, used to cool as building and to shut-off the air-conditioning system when the temperature of the fluid returning from the building drops below a predetermined value.

Still another object is to combine an air-conditioning system with a so-called processor embodying control logic elements, operating in response to low level signals, so that the combination may control the operation of the air-conditioning system.

And it is a further object of this invention to regulate an air-conditioning system so that it will efficiently and closely regulate the temperature of the liquid, such as water, which may be transmitted to a building for air-conditioning purposes and to achieve the necessary regulation without placing excessive stresses on the component machinery.

Figure 2:
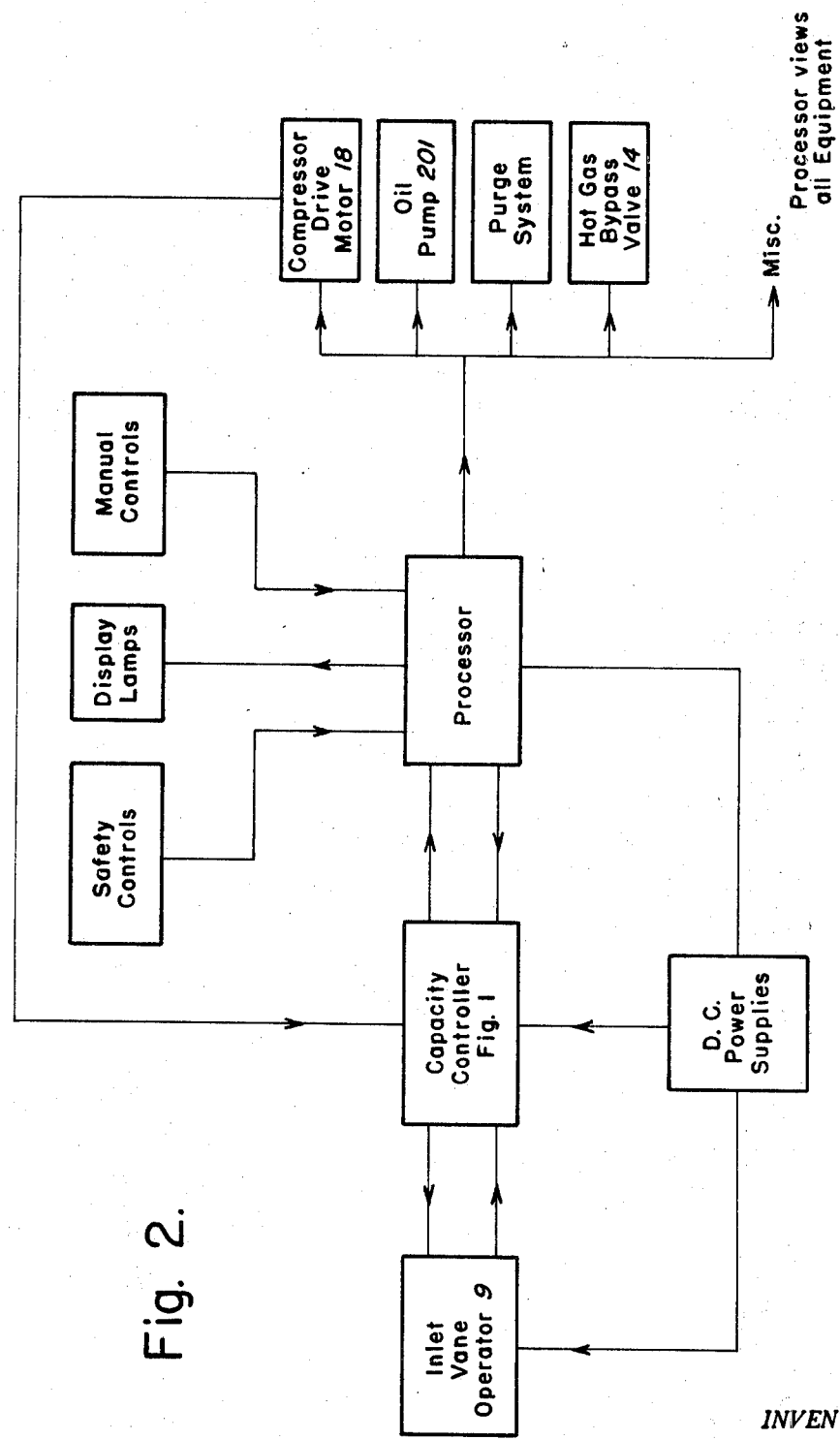
Figure 3:
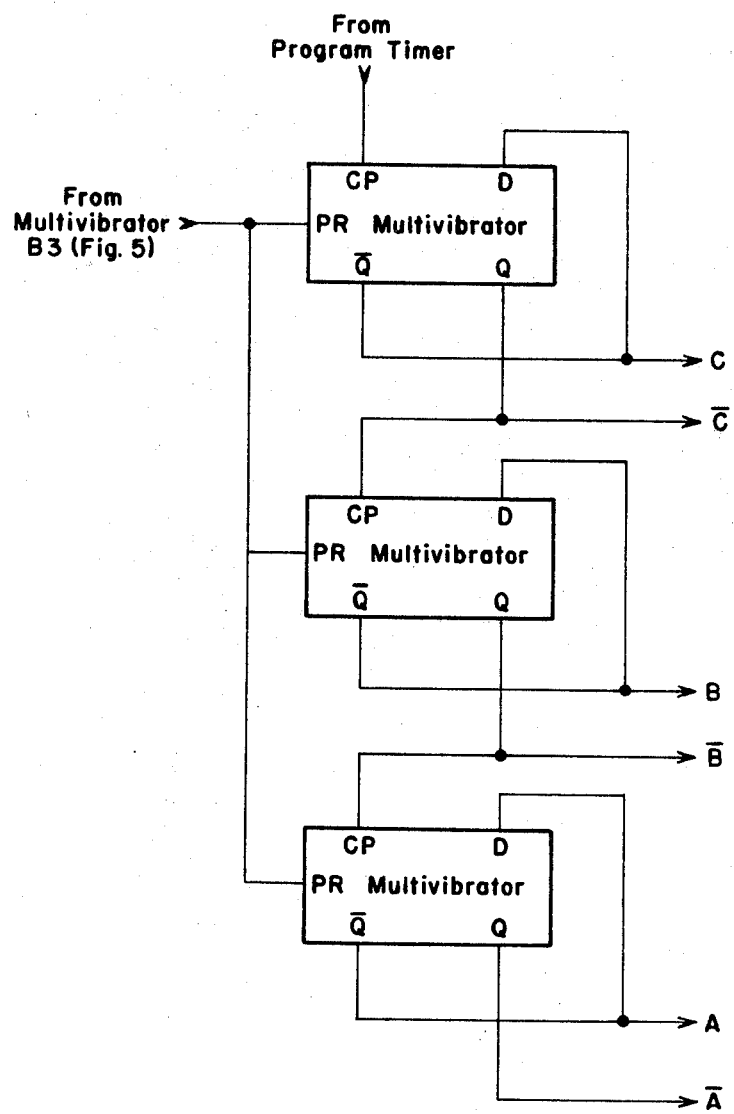
Figure 4:
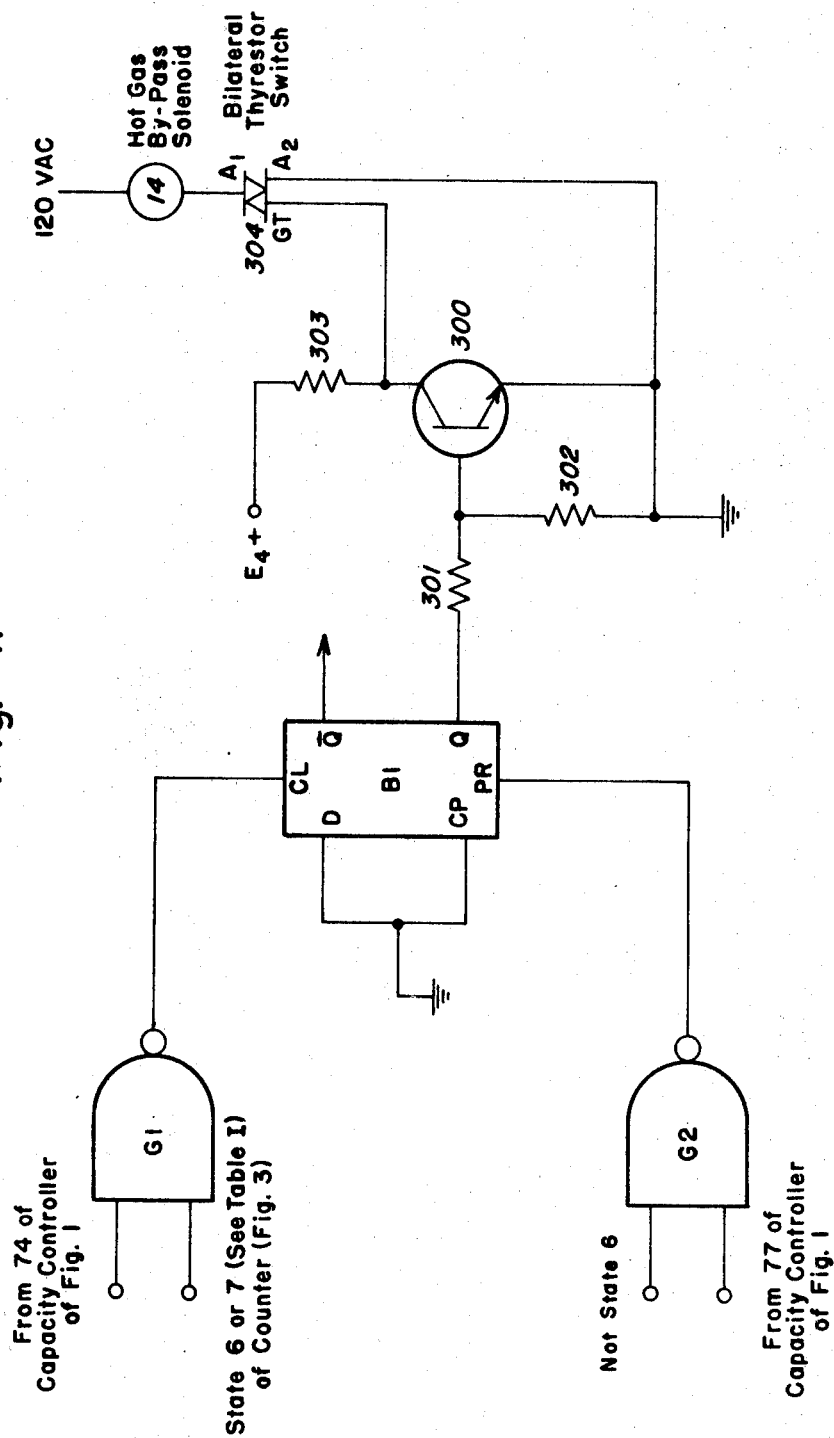
Figure 5:
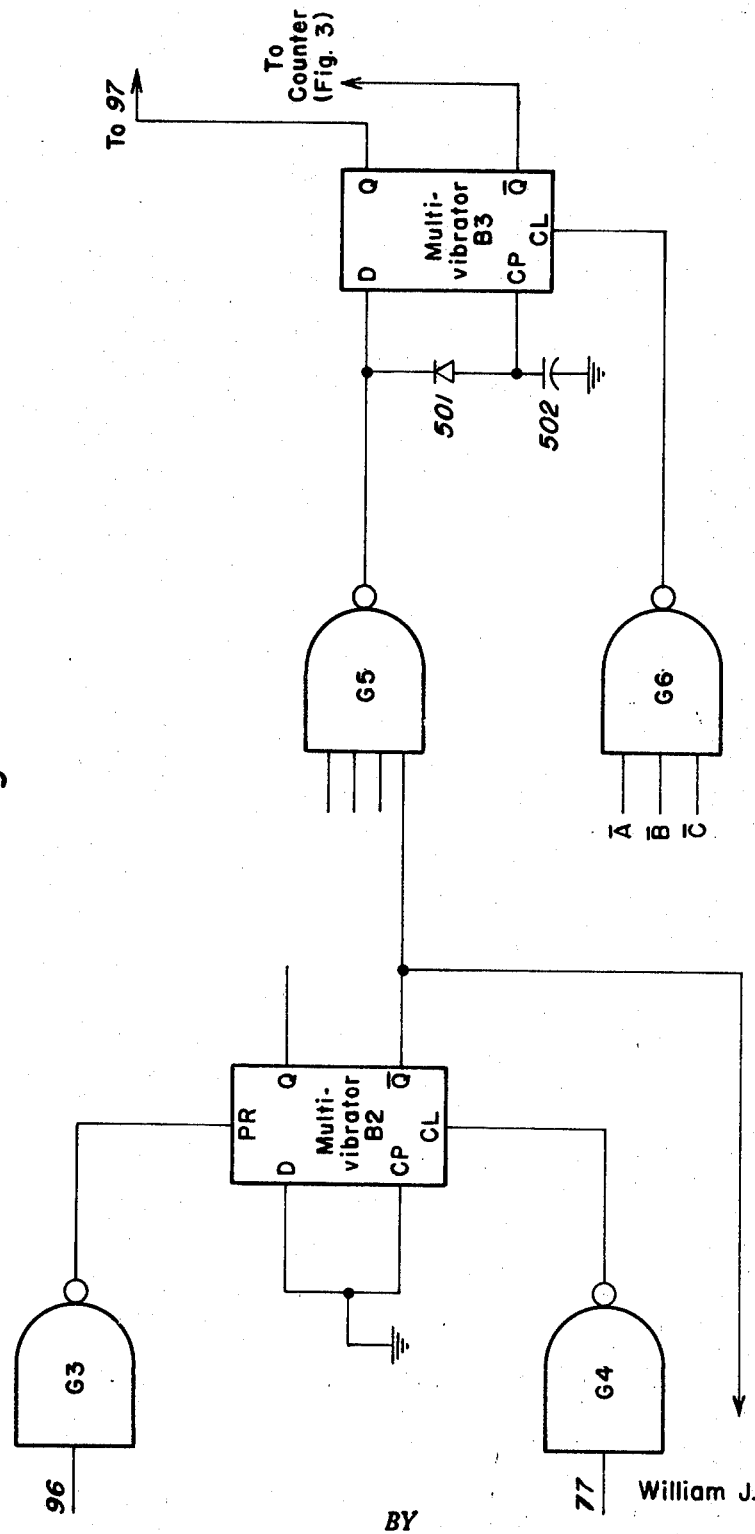

These and other objects and features will be better understood from the following more detailed description and explanation hereinafter given, when read in connection with the accompanying drawing in which FIG. 1 schematically illustrates the circuitry and construction of the more essential components of an arrangement for carrying out the principles and features of this invention; FIG. 1a shows the connection of a servo-mechanism of FIG. 1 to its control potentiometer; FIG. 2 schematically illustrates a block diagram of a processing arrangement which may be combined with FIG. 1; FIG. 3 illustrates a binary counter which is in block diagrammatic form and which may be a part of the so-called processor of FIG. 2; FIG. 4 schematically shows the logic circuitry for a hot-gas by-pass valve mechanism represented in FIG. 1; and FIG. 5 schematically represents, in block diagram form, some of the circuitry interconnecting certain multivibrators with terminals of the circuitry of FIG. 1.

OPERATION OF LIQUID CHILLER (AIR-CONDITIONING APPLICATION)

The liquid chiller operates on a refrigeration cycle, consisting of four basic processes: dry gas compression, constant pressure condensation, throttled pressure reduction and constant pressure evaporation. This basic cycle of operation is served by certain principal components shown in FIG. 1, the heat exchanger consisting of cooler or evaporator 1, condenser 2, float valve 3, and the single-stage centrifugal compressor 4.

Cooling water from the air-conditioning system is returned to the cooler or evaporator 1 at inlet pipe 5 and circulated through the tubes 6 of cooler 1. Since the liquid refrigerant 7 surrounding the tubes 6 is at a temperature lower than the temperature of the water circulating through the tubes 6, heat is transferred from the circulating water to the refrigerant 7. This chills the circulating water and, at the same time, causes the refrigerant 7 to boil off into a vapor state. The chilled water then recirculates to the air-conditioning system via the outlet pipe 8. The dry refrigerant gas passes through variable inlet vanes 9 at the compressor inlet that pre-rotates and throttles the gas before it enters the inlet of the impeller of compressor 4. The amount of prerotation is dependent on the refrigeration load and is automatically controlled by means included as part of this invention.

The single-stage compressor 4 raises the pressure of the refrigerant vapor entering from the low side of the cooler 1, which is at low pressure, to the high side pressure, which is the pressure developed in path 10. The compression of the vapor is accomplished by centrifugal force in the impeller of the compressor 4, and by diffusion in the diffuser and volute of the compressor 4. Compression of the refrigerant vapor to the high pressure of condenser 2 also raises its temperature above that of the available condenser water flowing through condenser 2.

The condenser water circulates through the tubes 11 of the condenser 2 at a lower temperature than the temperature of the compressed refrigerant vapor surrounding the condenser tubes 11 and, therefore, absorbs heat from the refrigerant vapor and condenses the vapor to a liquid. If a cooling tower is used, the condenser water within tubes 11 is re-circulated to a tower 13 (not shown) where it is cooled by atmospheric evaporation for re-use in the condenser cooling circuit.

The condensed liquid refrigerant, after it is cooled and therefore liquefied by the circulating water of tubes 11, flows into the condenser sump 12 of the condenser 2. Flow from the condenser sump 12 to the cooler 1 is controlled by a float control valve 3 which automatically keeps the condenser 2 free of liquid, ensures flooded operation of the cooler 1, and serves as a throttling valve to reduce the pressure of the refrigerant from the high side pressure within condenser 2 to the low side pressure within cooler 1.

The refrigerant passes through the evaporation stage, the compression condensation stage, and the throttling process stage in a continuous and repetitive cycle in an amount that is automatically regulated, in response to the refrigeration load, by the variable inlet guide vanes 9.

The hot-gas bypass valve 14 is automatically opened at low loads, allowing hot gas to pass directly from condenser 2 to evaporator 1, thus reducing the capacity of the machine.

DETAILED DESCRIPTION

The controlling network which provides regulation of temperature of the effluent water supplied through pipe 8 to the building to be air-conditioned is controlled through the modulation of inlet vane 9 position shown in FIG. 1. An electrohydraulic actuator 15 is connected to the vane position control arm 16. The position of actuator shaft 15a and correspondingly the position of vanes 9 are controlled by the magnitude of DC current flowing through the servo control valve coil 17 located within the actuator 15. The magnitude of the current through the servo valve coil 17 is regulated by a circuit responsive to the effluent water temperature but limited by a circuit responsive to the current of the compressor drive motor 18.

The circuit responsive to the effluent water temperature includes a wheatstone bridge circuit, one element of which is a thermistor 40 which is contained within a probe 19 immersed in the effluent water line. The physical connection of thermistor 40 to probe 19 will be of any well known type and need not be illustrated. Two of the arms of the bridge circuit are formed by DC power supplies 30 and 31. The supplies provide oppositely poled DC voltages $E_1$ and $E_2$ with respect to the circuit ground. Voltage levels $E_1$ and $E_2$ are opposite in polarity and, in this circuit, are equal in magnitude although it is not necessary that the magnitudes be equal. The other half of the bridge is formed by the network of resistors comprising the thermistor 40 and resistors 41 through 47. The output from the bridge is taken from the terminal or node 48 and, since diodes 50 and 51 are normally non-conducting, the output is applied to the inverting input terminal of amplifier 52. Amplifier 52 is an operational type amplifier characterized by a high voltage gain. In the configuration shown, with the input signal applied to the inverting input terminal 48 and a resistor 53 connected from the input terminal 48 to the output terminal 54, a corresponding voltage will appear at the output terminal 54 having a magnitude proportional to the magnitude of the current in conductor 49. Neglecting the effects of offset current and voltage associated with the amplifier 52, since these values are small relative to the signal levels, the polarity of the output voltage will be positive with respect to ground when the flow of current in conductor 49 is towards node 48 and negative if the flow of current is away from node 48. The ratio of voltage output to current input is determined primarly by resistance 53. Changes in the amplifier characteristics will produce only second or higher order effects. Capacitor 150 is used for phase compensation.

Another characteristic of the operational amplifier 52 used in this configuration is that the inverting input terminal remains virtually at ground potential regardless of input signal current magnitude or direction provided that the amplifier is not overdriven by an excessive input signal. Amplifier 52 may be either an integrated circuit type, a modular type comprised of a compact assembly of discrete components, or any arrangement of discrete components or combination of discrete components and integrated circuits. A type ua 709C amplifier manufactured by Fairchild Semiconductor and a type SQ 10A amplifier manufactured by NEXUS, are examples of types of operational amplifiers which have been employed successfully in the application. Depending on the particular type used, certain additional components, not shown in FIG. 1, may be required for phase compensation.

The output of amplifier 52 is applied to the base of NPN transistor 56 through resistor 55. An increase in the positive direction of this voltage will cause the current flow in the collector of transistor 56 to increase. This increase is accompanied by an increase of current in the actuator servo valve coil 17. The increase in the current of servo valve coil 17 causes the actuator shaft 15a to extend, opening the inlet vanes 9 and increasing the refrigeration capacity. In a similar fashion, a decrease in voltage at the output of amplifier 52 will reduce current flow in the servo valve coil 17 and cause the actuator shaft 15a to retract, closing the vanes 9 and reducing the refrigeration capacity.

How this control network regulates the effluent water temperature may now be seen by considering the sequence of events that takes place if, for example, the effluent water temperature should rise above a predetermined temperature. Thermistor 40, which has a negative temperature coefficient and is coupled to probe 19, will respond to an increase in the effluent water temperature, in which probe 19 is inserted, by exhibiting a decrease in resistance. Since the thermistor 40 is in the leg of the bridge connected to the negative DC voltage supply $E_2$, a decrease in resistance will result in an increase of current flow from the amplifier input terminal through conductor 49 to node 48. This will cause the voltage at the output of amplifier 52 to increase in the positive direction. Such an increase will result in an increase in current flow through the servo valve coil 17 of the actuator 15, as explained previously. The actuator shaft 15a will extend the opening of the vanes 9, increasing the refrigeration capacity and this in turn will cause the effluent water temperature to fall back toward the predetermined temperature. In a similar manner, the actuator shaft 15a will retract when the leaving water temperature falls below the set point, thereby reducing the refrigeration capacity.

In order to prevent unstable operation of this control circuit or what is known as hunting, potentiometer 45 has been included across the DC voltage legs 30, 31 of the bridge. The wiper of this potentiometer is mechanically coupled to the actuator shaft 15a. This is shown in FIG. 1a. The wiper is electrically coupled through resistors 46 and 47 to node 48 and thus forms a part of the bridge circuit. As the actuator 15 starts to move in a direction to compensate or correct for a change in the effluent water temperature, the wiper of potentiometer 45 will move in a direction to reduce the output signal at node 48. The effect is to reduce the sensitivity of the control circuit and stabilize the operation against variations in component values as might be caused by manufacturing tolerances and environmental conditions. The feedback potentiometer 45 results in "proportional" control rather than "floating" control. That is, the opening of vanes 9 will be directly and continuously proportional to the difference between the actual effluent water temperature and the predetermined temperature. The proportionality factor, which is defined as the modulating range or throttling range, is determined by the setting of potentiometer 47 in combination with resistor 46.

Variable resistor 43 is the set point adjustment. Response of the control circuit to changes in the setting of resistor 43 is the same as it is to a change in the thermistor resistance 40 but in the opposite sense. This is because resistance 43 is in the leg of the bridge connected to the positive DC voltage supply $E_1$. Resistors 41, 42 and 44 are fixed resistors used to complete and balance the bridge. Diodes 50 and 51 are used as a continuously acting bilateral shunt to protect amplifier 52 from excessive input signal voltages of either polarity as might be encountered if one leg of the bridge is opened as, for example, when replacing or installing the temperature probe 19. Since, in normal operation, node 48 is at ground potential, these diodes 50 and 51 are normally non-conducting and have no effect on the circuit operation. They are conductive to ground only when voltages exceeding a predetermined value of either polarity are applied thereto. Transistors 101 and 103 have been assumed to be turned off or non-conducting thus far. The operation and effect of these transistors will be discussed later.

The actuator position signal taken from the wiper of bridge potentiometer 45 is also applied to resistors 59 and 66. The network composed of resistors designated 59 through 64, NPN transistor 65 and diode 73 functions to limit the closure of inlet vanes 9. If the inlet vanes 9 are allowed to close beyond a certain point, an undesirable operating condition, known as "low-load rumble," will result. It is the object of this network, therefore, to restrict the degree of vane closure, regardless of the effluent water temperature, so that the "low-load rumble" condition never occurs. The minimum vane position may be varied over a wide range by means of potentiometer 62. As long as the vanes are opened beyond the minimum setting, sufficient current will be injected into the base of transistor 65 to maintain the collector voltage of transistor 65 below the voltage at the base of transistor 56. Under this condition, no current will flow through diode 73.

As the vanes 9 start to close, the voltage at the wiper of potentiometer 45 will become less positive, finally passing through zero and going negative. As this happens, current is diverted from the base of transistor 65 through resistor 59. Eventually the base current in transistor 65 will no longer be sufficient to maintain the voltage of the collector of transistor 65 below the voltage at the base of transistor 56. When the collector voltage of transistor 65 rises a few tenths of a volt above the base of transistor 56, current begins to flow from source $E_1$ through resistor 63, through diode 73 and into the base of transistor 56. The added base current in transistor 56 causes the collector current of transistor 56 and, consequently, the current through servo valve coil 17, to increase. This increase in current flow through coil 17 opposes the decrease in current flow through coil 17 which initially caused the vanes 9 to retract. Further vane closure is thus inhibited since any further closure will result in an opposing current flow through valve coil 17 and thus low-load rumble will be inhibited. No mechanical valves or other manually operated devices need be adjusted to accomplish this result. Resistor 64 in this network reduces the gain from base to collector of transistor 65, thereby stabilizing the operation of the feedback loop.

The network comprising resistors 66 through 69 and 71 and NPN transistor 72 initiates the opening of the hot-gas bypass valve 14 interposed between cooler 1 and condenser 2. The voltage at terminal 74 is applied to a multivibrator (not shown) in the processor of FIG. 2. When transistor 72 is cut-off, that is, it is non-conducting from collector to emitter, the voltage at terminal 74 will be at a level sufficiently high to operate the multivibrator in the processor. Transistor 75 is maintained non-conducting in this condition. Upon being operated, the multivibrator will generate a signal which will cause the hot-gas bypass valve 14 to be opened, reducing the capacity of refrigeration. The circuitry between valve 14 and the multivibrator would be of any well known form and need not be illustrated.

The above-noted network operates in substantially the same manner as the network used to limit the closure of vanes 9 except that a feedback resistor is not included between the collector and base of transistor 72 as it is with transistor 65. The absence of the feedback resistor results in a more rapid transition in the voltage level at terminal 74 from the lowermost to the uppermost value. This voltage transition occurs when the inlet vanes 9 close sufficiently, that is, to a point where the voltage at the wiper of potentiometer 45 approximately equals the voltage at the wiper of potentiometer 68. The use of position of the vanes 9 to detect a low-load condition and initiate operation of the hot-gas bypass valve 14 is a feature of this arrangement. It is in contrast to a commonly used alternative method of sensing influent water temperature for the same purpose. Steady-state vane position has been found to be more truly indicative of system load than is influent water temperature which is, incidentally, also a function of the effluent water temperature set point. Furthermore, because the signal from or voltage on terminal 74 is used to set into operation the multivibrator of the processor of FIG. 2, the hot-gas bypass valve 14 will remain open even after the inlet vanes 9 start to open in response to a rise in the effluent water temperature which follows the opening of the hot-gas bypass valve 14 and the return of the voltage at terminal 74 to near zero. The characteristic of the multivibrator is such that it will operate and remain operated to hold valve 14 open even after the set voltage at terminal 74 has disappeared. This prevents continuous re-cycling of the hot-gas bypass valve 14. This is a positive feature of the present arrangement.

Since the refrigerating apparatus is always started with the inlet vanes 9 closed, the hot-gas bypass valve 14 must be prevented from opening during the start-up of the system. This is accomplished with transistor 75 which is turned on only during start-up by a signal supplied from the processor of FIG. 2 applied to terminal 76. While transistor 75 is turned on, the voltage at terminal 74 cannot rise to a level sufficient to start the multivibrator in the processor of FIG. 2. This is another important factor in this arrangement.

Once opened, the hot-gas bypass valve 14 will not close until a signal is applied to the reset terminal of the multivibrator of FIG. 2 which is used to control the valve operation. This reset signal for the multivibrator is also provided by this invention at terminal 77. When the effluent water temperature rises to some specific level above a predetermined set point temperature, the voltage at terminal 77 will undergo a transition from a near zero level to a level sufficiently high to reset the multivibrator in the processor of FIG. 2. This temperature difference is measured and determined at the output 54 of amplifier 52. As long as the actuator travel arm 15a has not reached either end of its travel, the voltage level at terminal 54 will be relatively low, for example, less than two volts. Once the actuator extension is limited either by mechanical limitations or by the compressor drive motor current limiter circuit, which will be discussed later, the voltage at terminal 54 will rise proportionally to match the rise in the effluent water temperature. The proportionality constant is fixed by and calculable from the circuit elements which comprise the bridge and the magnitude of resistor 53 across amplifier 52. Because the proportionality constant can be easily determined, the voltage transition may be caused to occur at terminal 77 at a fairly precise level of elevation of the effluent water temperature, for example, 2° F. The circuit network which performs this function consists of resistors 78 through 84, PNP transistor 85, NPN transistors 86 and 88, and diode 87. The voltage at terminal 54, which will cause the voltage level at 77 to rise from near zero to its maximum value, is set primarily by resistors 78 and 79, supply voltage $E_2$, and secondarily by the base-emitter voltage of transistor 88 and the anode to cathode voltage of diode 87.

When the voltage at terminal 54 is below the level at which the transistion at terminal 77 occurs, the base of transistor 85 will be negative. The current flow through resistor 79 toward the voltage source $E_2$ will exceed the current flow through resistor 78 from the emitter of transistor 88 which operates as an emitter-follower for amplifier 52 to minimize the loading of amplifier 52. The excess current flow in resistor 79 comes from the base of transistor 85. This base current causes the collector terminal voltage of transistor 85 to be held near zero. Because the collector of transistor 85 is at a near zero voltage level, the base emitter terminal of transistor 86 will be forward-biased. Current flow into the base of transistor 86 under this condition will hold the collector voltage of transistor 86 to near zero.

When the voltage at terminal 54 rises, current flow in resistor 79 and, consequently, the current flow from the base of transistor 85 decreases. This decrease will continue as the voltage at terminal 54 rises until the base current in transistor 85 is no longer sufficient to hold the collector near ground. The collector of transistor 85 will rapidly approach cut-off, causing a negative voltage to appear at the base of transistor 86. Transistor 86 then becomes cut-off or non-conducting, and the voltage at terminal 77 rises toward a positive value determined by the positive supply voltage $E_1$ and the resistors 83 and 84.

This positive voltage level at terminal 77 will reset the multivibrator in the processor (see FIG. 2), causing the hot-gas bypass valve 14 to close. Although the voltage level at point 54, which causes this transition to occur, is fixed by resistors 78 and 79, an adjustment means obviously can be readily incorporated merely by adding a variable resistor in either the circuit branch containing resistor 78 or the one containing resistor 79.

Diode 87 is included to prevent reverse breakdown of the base-emitter junction of transistor 88 when the voltage is lower than about −6 v.

The methods of operating the hot-gas bypass valve 14 just described are far superior to those conventionally used for operating the valve. The operating conditions under which the valve 14 opens and closes are more precisely controlled and more truly indicative of actual system load. The operating points are independent of the effluent water temperature set point and are essentially immune from drift caused by changes in the ambient temperature.

When the cooling load fed from point 8 of the system is so low that the effluent water temperature continues to fall even after the inlet vanes 9 have been throttled to the minimum position and the hot-gas bypass valve 14 is opened, it is desirable to shut down the entire system. A temperature controller, with a sensor mounted in the effluent water line, may be used to initiate such a shutdown. This temperature controller is set to trip when the effluent water temperature at point 8 falls about 2° F. below the set point corresponding to minimum vane position. Thus, the trip point is a function of both the temperature set point and the modulating range. Furthermore, a drift in the trip point will be independent of any drift in the sensor or thermistor 40 which is used to determine and then to control the effluent water temperature.

A simple circuit included in this invention will, through the processor of FIG. 2, reliably shut the air-conditioners of the system off whenever the effluent water temperature falls below the set point corresponding to minimum vane position by a fixed amount such as 2° F. Since the trip point established by this circuit is strictly a function of temperature difference, it will automatically track the set point. That is, it is not necessary to re-adjust the trip point after an adjustment of the effluent water temperature is made. Furthermore, the drift in this set point over a wide range of ambient temperatures will be low, typically in the order of 0.2° F.

The circuit which detects the 2° F. differential operates in a manner which is analogous to the manner in which the circuit detects the 2° F. differential for the purpose of closing the hot-gas bypass valve 14. The output of amplifier 52 is measured by a comparator circuit consisting of transistors 89 and 95, diode 90 and resistors 91 through 94. The output voltage of amplifier 54 will range between a minimum level near zero and a maximum level of 1 to 2 volts positive, while the steady state position of the inlet vanes 9 is between minimum and maximum limits as determined either by mechanical stops or by the operation of the other circuits included within this invention to be described. If the effluent water temperature continues to fall after the vanes 9 have closed to the minimum position, the voltage supplied to terminal 54 will continue to fall below zero toward some negative limit. Between zero voltage and the negative limit, there lies a negative voltage at which the NPN transistor 95 will turn off and cause a voltage transition at terminal 96 from an initial value near zero to a positive level sufficient to be detected by the processor of FIG. 2. In response to the positive level, the processor will cause the air-conditioning system to shutdown through a programmed sequence.

As long as the voltage at terminal 54 is higher than the level which causes the transistor 95 to turn off, sufficient current is injected into the base of transistor 95 to maintain the level at terminal 96 near zero. As the voltage at terminal 54 continues to fall, more and more current is diverted from the base of transistor 95 through resistor 91, diode 90, from emitter to collector of PNP transistor 89 to negative supply source $E_2$. When the voltage at terminal 54 reaches the trip point, the current into the base of transistor 95 is no longer sufficient to hold terminal 96 to a level near zero. A very slight additional decrease in voltage at terminal 54 will now cause the voltage to rise to the upper level initiating the shutdown of the conditioning system. By including a potentiometer in either the leg containing resistor 91 or the leg containing resistor 92, the trip point can be made adjustable to any desired extent.

Diode 90 is included to prevent reverse breakdown of the base-emitter junction of transistor 89 when the voltage supplied by amplifier 52 to terminal 54 reaches a positive value greater than 6 volts.

When a low-load shutdown of the type just described occurs, the processor of FIG. 2 applies a ground voltage to terminal 97 of FIG. 1 which is normally held at a positive voltage sufficient to saturate NPN transistor 100, that is, to maintain a near-zero voltage between the collector of transistor 100 and ground. When transistor 100 is saturated, no current will be injected into the emitter of PNP transistor 101 and, consequently, no current will flow in conductor 102 from the collector of transistor 101. Under such a condition, transistor 101 has no effect in the bridge circuit used to compare the effluent water temperature with the set point. When a low-load shutdown occurs, however, the voltage at terminal 97 is clamped to ground potential, cutting off transistor 100. A current will now flow from positive supply $E_1$ through resistor 99, through emitter collector circuit of transistor 101, through conductor 102 into the junction of resistors 41 and 42 of the bridge. The resulting current flow into the junction of resistors 41 and 42 unbalances the bridge circuit just as if the set point control 43 were raised to correspond to a higher temperature. Thus, a low-load shutdown will automatically raise the effluent water temperature set point by a fixed amount. The amount of this re-set is determined by the supply voltage $E_1$ and the value of resistor 99. Raising the set point in this way will prevent the air-conditioning system from frequently recycling under low-load conditions since the effluent water temperature must rise substantially in order to produce the voltage transition at terminal 77 necessary to re-start the machine after a low-load shutdown. The voltage at terminal 77, in addition to initiating closure of the hot-gas bypass valve 14, is also used by the processor of FIG. 2 to restart the air-conditioning system following a low-load shutdown.

Whenever the air-conditioning system is not running either because of a low-load condition, a safety shutdown or simply because the switch is off, it is necessary that the inlet vanes 9 be fully closed to protect the system. The reason for this is that it is desirable to start the machine with the vanes 9 closed because the stress imposed on the compressor 4 and its motor will then be considerably less. This function is accomplished by transistor 103 and resistor 104 used in conjunction with the processor of FIG. 2. Whenever the air-conditioning system is off, the processor applies a positive voltage to terminal 105 which injects a current through resistor 104 into the base of transistor 103 of sufficient magnitude to saturate transistor 103. Under this condition, any current flowing through resistor 55 or diode 73 will bypass the base of transistor 56 and will flow, rather, into the collector of 103. With no current flowing into the base of transistor 56, only a minute or negligible current will flow through the servo valve coil 17. This current will be insufficient to hold the actuator 15 opened and the actuator arm 15a will return to the fully retracted position.

As indicated previously, this invention also includes means for limiting the current flow into the compressor drive motor 18. Since steady state current into the compressor drive motor 18 is directly related to the position of the inlet vanes 9, limitation of drive motor current can be accomplished by limiting the vane opening. Limitation of the maximum vane opening is in turn accomplished by limiting the maximum current which may flow through the actuator servo valve solenoid 17. When the compressor drive motor current is below the upper limit, transistor 107 is cut off and all current flow through resistor 117 is into the base of transistor 106. The size of resistor 117 and the current gain of transistor 106 are such that under this condition the voltage at the emitter of transistor 106 is nearly equal to the positive supply voltage $E_3$ to the servo valve coil 17 even when the current through coil 17 is maximum, that is, when transistor 56 is saturated or fully turned on. The position of actuator 15 then is under the full control of transistor 56 and the circuits which operate transistor 56. Once the compressor drive motor 18 delivers current exceeding the limit set by resistors 124 through 128, current through the collector of transistor 107, and therefore through resistor 117, will increase very rapidly with any further increase in drive motor current. As current through resistor 117 increases, the voltage available to the servo valve solenoid 17 via the emitter of transistor 106 decreases, thereby limiting the current flow through the servo valve solenoid 17. The inlet vanes 9 are thus prevented from opening further and the compressor drive motor 18 delivers a current which is effectively limited.

The current of the drive motor 18 is sensed and measured with a current transformer 135. Because the drive motor 18 operates on a balanced single or multi-phase circuit, the magnitudes of the currents in each of the power supply lines are nearly equal. Thus, only a single current transformer need be used to measure the current in only one of the power supply lines to the motor 18. Resistor 134 provides a low resistance path for the secondary of the current transformer 135 and is typically in the order of tenths of ohms. An AC RMS voltage appears across resistor 134. This voltage, which is directly proportional to the current in conductor 140, is applied through resistor 133 to the base of transistor 113. Breakdown diode 113 conducts on the negative half cycles of voltage applied to the base of transistor 112 and conducts also when the magnitude of the voltage in the positive half cycles exceeds the reverse breakdown value of the diode 113. Resistor 133 limits the current flow through diode 113 to a safe value when diode 113 is conducting. When diode 113 is not conducting, the equivalent resistance looking into the base of transistor 112 is large with respect to the resistance 113 so that each full positive half cycle of the voltage appearing across resistor 134 is applied to the base of transistor 112 with negligible attenuation. The input circuit thus described protects transistor 112 against large voltage transients which would otherwise accompany transients in the current in conductor 140, such transients occurring, for example, during the starting of motor 18. By-pass capacitor 114 offers further protection against high frequency transients which may occur in the input circuit.

The limit of current flow is set by variable resistors 125 and 127, and fixed resistors 124, 126 and 128. Potentiometer 125 is the principal current limiter and is usually calibrated in percent of full load current. Potentiometer 127 is a trimmer used to compensate for tolerances in the current transformer ratio as well as other component tolerances.

When the compressor drive motor 18 delivers current which is less than the limit set by potentiometers 125 and 127, the peak voltage at the base of transistor 112 is less than the DC level established at the base of transistor 111. Neglecting mismatch in the base-emitter characteristics of transistor 111 and transistor 112 since these can be compensated by potentiometer 127, transistor 112 is thereby cut off and a negligible current flows in resistor 131. The voltage drop across resistor 131 is not sufficient to cause current flow in the emitter-collector circuit of PNP transistors 109 and resistor 122. Current flow is rather through the collector-emitter of transistors 111 and 110. The absence of current in resistor 122 results in an absence of current flow in either resistor 119 or 118 since no voltage is available to turn the transistor 107 or 108 on. There is no current flow, therefore, into the collector of transistor 107 and, as described previously, nearly the full value of supply voltage $E_3$ appears at the emitter of transistor 106.

Once the peak voltage at the base of transistor 112 barely exceeds the DC voltage level at the base of transistor 111, current beings to flow through resistor 131 into the collector of transistor 112 but only during that portion of the positive half cycle during which the voltage at the base of transistor 112 exceeds the voltage at the base of transistor 111. When current flows through resistor 131, transistor 109 conducts current from its emitter to its collector. Most of this current passes through resistor 122. The net result is that the circuit now acts as a high gain differenial amplifier, but amplifying only that portion of the input voltage signal which exceeds the DC level established at the base of transistor 111. The voltage appearing across resistor 122 is, therefore, a series of segments of a rectified sine wave. This voltage waveform is converted to a smooth DC level by transistors 107 and 108 and capacitor 116. When the voltage at the base of transistor 108 is positive going, capacitor 116 will charge rapidly toward the peak value of this voltage. The charging time constant is relatively fast because the resistance looking into the emitter of transistor 108 is low. When the voltage at the base of transistor 108 falls below the voltage level on capacitor 116, transistor 108 will be cut off since reverse current cannot flow into the emitter of transistor 108. During this period, capacitor 116 will discharge through the relatively high resistance path of resistor 119 in parallel with the resistance seen looking into the base of transistor 107. When the charging time constant is much shorter than the discharge time constant, as it is in this case, a DC voltage appears across the capacitor 116 which is nearly equal to the peak of the voltage appearing at the input (i.e., the base of transistor 108). The resulting DC voltage causes a proportional DC current to flow in resistors 118 and 117. This flow of current reduces the voltage at the emitter of transistor 106 as previously described, thus limiting the extent of the opening of vanes 9 and the current of compressor drive motor 18.

Resistor 136 and capacitor 115 provide a feedback voltage to the base of transistor 111 to limit the overall circuit gain if desired. Neither of these two components are always necessary and can be considered optional. Resistor 129 lowers the effective supply voltage for transistors 111 and 112. This prevents the difference in the collector voltages of transistors 112 and 111 from ever exceeding the reverse emitter breakdown voltages of transistors 109 and 110.

The current limit circuit, in addition to being immune to the effects of large current transients in conductor 140, is only very slightly effected by large changes in ambient temperature. This feature is important for many of the commercial applications.

The processor which is used in connection with this invention and is shown in the block diagram of FIG. 2, comprises a plurality of solid state electronic components including digital integrated circuits, transistors, thyristors as well as passive components. The processor of FIG. 2 accepts signals both from the capacity controller (FIG. 1) and from manually and automatically operated bi-state controls. Based on the combinational state of these signals as well as previous combinational states, the processor regulates the operation of the various motors and valves associated with the chiller 1 to which the invention is directed. The individual circuits which comprise the processor are for the most part well known to those skilled in the technology. The novelty lies in the way in which these circuits are combined to effect the control of chiller capacity and its operation. Therefore, only that portion of the processor which specifically pertains to its control and operation will be described here and only to the extent deemed necessary to enable practice of this invention.

Central to the operation of the processor is a binary ripple counter and a program timer which would also be included in the processor. The three-state ripple counter schematically shown in FIG. 3 can assume eight distinct states. The state of the counter in combination with its input signals determines which of the various motors, solenoids, and display lamps are placed in operation. The counter stages may be regarded as memory elements. Because of these memory elements, the operating state of the chiller 1 of FIG. 1 depends not only on the combination of input signals but also on previous combinations or states. The counter, in combination with the program timer or clock, regulates the sequence of machine operations during start-up and shutdown.

Table 1 shows the relationship between counter states, which are eight in number, and the machine operation during start-up and shutdown. For example, when the counter is in state 7, which is the RUN state, the program timer is inhibited. The chiller 1 thus remains in the RUN state until a shutdown is initiated by one of the manual or automatic controls of the system. In state 5, for example, the chiller 1 is either totally shutdown or in the first stage of the starting sequence. If the on-off selector switch is ON, and if all of the safety controls are in the NORMAL state, and if the multivibrator associated with the low water temperature shut-down control is RESET, then the system will be in the first stage of the start-up sequence. If any one of these conditions is not satisfied, the system will be totally shutdown in state 5, as will be apparent from the table.

TABLE I

| Counter state | Counter outputs (Fig. 3) | | | Chiller operating state | Oil pump | Compressor motor | Purge system |
|---|---|---|---|---|---|---|---|
| | A | B | C | | | | |
| 5 | 1 | 0 | 1 | Prelube or off [1] | On or off [1] | Off | Off. |
| 6 | 1 | 1 | 0 | Prepurge | On | On | Off. |
| 7 | 1 | 1 | 1 | Run | On | On | On. |
| 0 | 0 | 0 | 0 | Post lube | On | Off | Off. |
| 1 | 0 | 0 | 1 | | On | Off | Off. |
| 2 | 0 | 1 | 0 | | On | Off | Off. |
| 3 | 0 | 1 | 1 | | On | Off | Off. |
| 4 | 1 | 0 | 0 | Recycle | Off | Off | Off. |

[1] Depends upon status of on-off selector switch, safety controls and low load control.

With the preceding information as background, attention may now be directed toward that portion of the processor which operates the hot-gas bypass valve 14 in response to signals originating from terminals 74 and 77 of the capacity controller of FIG. 1. The related processor circuit is shown in FIG. 4 but this circuit must be considered and coordinated with the other figures of the drawing.

Assuming that the bistable multivibrator designated B1 of FIG. 4 is initially in the PRESET state, a positive voltage will appear at the terminal Q of multivibrator B1 while the voltage at terminal $\bar{Q}$ will be near zero. The positive voltage at terminal Q will cause current to flow through the resistor 301 into the base of NPN transistor 300. Resistor 301 and transistor 300 are selected so that transistor 300 will be saturated under this condition. The voltage impressed across the Gate GT of the bilateral thyristor 304 will not be sufficient to maintain conduction from the A1 terminal to the A2 terminal. Thus, no current flows through the hot-gas bypass solenoid 14 and the hot-gas bypass valve 14 remains closed.

When a positive voltage appears at terminal 74 of the capacity controller of FIG. 1 as previously described, and the processor counter is in either state 6 or state 7, that is, the chiller is in operation, then the output of gate G1, which is a NAND gate, will fall to a value near zero. The low voltage appearing at the terminal CL of multivibrator B1 will cause multivibrator B1 to assume the CLEAR state, under which condition the voltage at terminal Q is reduced to a value near zero. Multivibrator B1 will remain in the CLEAR state even if the voltage at its CL terminal returns to a positive value. When the voltage at terminal Q falls to a value near zero, transistor 300 will become cut off and voltage E4 will be applied to the gate GT of thyristor 304 through resistor 303. The thyristor 304 will then conduct from anode A1 to anode A2, energizing the hot-gas bypass solenoid 14 and opening the valve which it controls. This condition will persist until the voltage at the PR terminal of multivibrator B1 is reduced to near zero. When this voltage transition does occur, multivibrator B1 will assume the original state and the hot-gas bypass valve 14 will close. This transition will occur when both inputs to the NAND gate G2 are sufficiently positive with respect to ground. This will occur when the counter is not in state 6 and when the voltage at terminal 77 of the capacity controller of FIG. 1 is positive as described. Furthermore multivibrator B1 will remain in the PRESET state even if the voltage at its PR terminal should return to a positive value.

When the counter in the processor is in any state other than state 7, a positive voltage is applied to terminal 76 of FIG. 1. The resulting current injected into the base of NPN transistor 75 holds terminal 74 at ground potential. Thus, the multivibrator B1 can be reset to the CLEAR state through its CL terminal only when the counter is in state 7, which is the RUN state. This prevents the chiller 1 from starting with the hot-gas bypass valve 14 open. This is a necessary and desirable condition. The signal applied to terminal 76 originates from the output of a NAND gate in the processor of FIG. 2. The inputs to the NAND gate are the signals A, B, and C taken from the output of the counter (FIG. 3).

FIG. 5 shows the portion of the processor of FIG. 2 which causes the chiller 1 to be shut-down when the effluent water temperature falls 2° F. below the set point corresponding to minimum vane position. Under normal running conditions, each of the inputs to gate G5 is a logical "1". That is, a positive voltage appears on all input lines. The output of gate G5, a NAND gate, is then a logical "0." That is, the output voltage is near ground potential. The bistable multivibrator B3 of FIG. 5 is CLEAR so that a positive voltage is present on its $\bar{Q}$ terminal while a voltage close to ground potential is present on its Q terminal which is connected to terminal 97 of FIG. 1.

When a positive signal appears at terminal 96 of the capacity controller of FIG. 1 indicating low water temperature as described hereinabove, the voltage at the PR terminal of multivibrator B2 of FIG. 5 will fall toward ground potential because of the inversion property of gate G3. This transition at the PR terminal of multivibrator B2 will preset multivibrator B2, causing the voltage at its Q terminal to fall toward ground potential. When this occurs, the output of gate G5 will rise to a positive level as a logical "1." This positive voltage will be applied to terminal D of multivibrator B3 and, at the same time, back bias diode 501 so that diode 501 will no longer conduct. The steady current which continuously flows from the CP terminal of multivibrator B2 will charge up capacitor 502. The nature of the multivibrator B3 is such that a positive voltage on its terminal CP in coincidence with a positive voltage on its terminal D will cause the devce to switch to the PRESET state. This coincidence will occur when a positive voltage is supplied to the D terminal for a sufficient length of time to allow the capacitor 502 to charge to the critical positive voltage level. The delay mechanism afforded by the diode-capacitor combination prevents "false" shutdowns which would otherwise occur every time a momentary positive noise pulse appeared at the output of gate G5.

The negative transition in voltage at the Q terminal when multivibrator B3 is PRESET is applied in parallel to the PR terminals of each of the counter states of FIG. 3. The result is that the counter is immediately shifted to state "0" (A=B=C="0") which, as can be seen from Table 1, is the first stage of the shutdown sequence. The compressor 4 is immediately shutdown by a gate-transistor-thyristor combination similar to that in FIG. 4.

As soon as the counter enters state 0, each of the inputs to gate G6 become a logical "1." The voltage at the output of gate G6 then falls toward ground potential, or logical "0" and this returns multivibrator B3 to the CLEAR state.

The output from the Q terminal of multivibrator B3 is also wired to terminal 97 in the capacity controller (FIG. 1). Thus, the effluent water temperature set point is automatically raised by a fixed amount following a low load shutdown of this type. The operation of the related circuit in the capacity controller (FIG. 1) is described hereinabove and need not be repeated.

The particular arrangement of the logic gates and multivibrators just described may be varied as desired to suit particular applications and conditions of operations, as will be apparent to those skilled in the art.

Although this invention has been shown and described in certain particular arrangements merely for illustrative and explanatory purposes, it will be apparent that the general principles and features of this invention may be embodied in and applied to other and widely varied organizations without departing from the spirit of the invention.

What is claimed is:

1. A temperature regulating system comprising the combination with a machine designed to transmit a fluid medium for controlling temperature, said machine including a cooler, a condenser and a compressor, said combination including adjustable vanes interposed between said cooler and said compressor, a solenoid valve controlled conduit interposed between said cooler and said condenser, means for setting the range of movement of said vanes so as to maintain a predetermined range of temperatures for said fluid medium, means responsive to a change of the temperature of said fluid medium beyond said predetermined range to directly adjust the vanes and the valve to return said temperature to within said predetermined range, and means responsive to the temperature of said fluid medium to control the range of adjustment of said vanes.

2. A temperature regulating system according to claim 1, in which said vane adjusting means will be operated to close said vanes in response to a lowering of the temperature of the fluid medium below said predetermined range so as to increase the temperature of the fluid medium, and operated to open said vanes in response to a rise of said temperature above said predetermined range of the fluid medium so as to reduce the temperature of the fluid medium.

3. A temperature regulating system according to claim 2, the combination including a servo mechanism the operation of which is controlled by the temperature of said fluid medium, and means to couple said servo mechanism to said adjustable vanes to control the opening and closing of said vanes.

4. A temperature regulating system according to claim 3, the combination including a bridge circuit coupled to the servo mechanism and responsive to the temperature of the fluid medium to control the operation of the servo mechanism.

5. A temperature regulating system according to claim 4, the combination including a thermistor immersed in said fluid medium and responsive to the temperature of the fluid medium, said thermistor being an element of said bridge circuit to adjust the bridge circuit by an amount which corresponds to the variation of the temperature of said fluid medium.

6. A temperature regulating system according to claim 5, the combination including, in addition, an amplifier, and means to cause the amplifier to respond to the adjustment of the bridge circuit to control the operation on the servo mechanism.

7. A temperature regulating system according to claim 6, including a motor, means coupling the motor to the compressor, and means to limit the current supplied to said motor, said current limiting means being substantially independent of transient effects and of ambient temperatures.

8. A temperature regulating system employing a fluid medium to maintain the temperature of the system within a predetermined range, comprising a machine through which said fluid medium is transmitted, said machine including a compressor, a condenser and a cooler, means including a movable vane member coupled between said compressor and said cooler, and a solenoid valve controlled conduit coupled between said cooler and said condenser to control the temperature of the fluid medium transmitted through said machine, means for setting the limits of movement of said vane member to maintain the temperature of the system within said predetermined range, and means responsive to a change in the temperature of said fluid medium beyond said predetermined range to directly adjust said vane member and said solenoid valve to change the cooling capacity of said machine so as to return the temperature of said fluid medium to within said predetermined range.

9. A temperature regulating system according to claim 8 in which said responsive means includes means to adjust the cooling capacity of said machine in one direction as the temperature of said fluid medium rises above said predetermined range and to adjust said capacity in the opposite direction as the temperature of said fluid medium falls below said predetermined range.

10. A temperature regulating system according to claim 7, including, in addition, a temperature responsive element immersed in said fluid medium, as it is discharged from said machine to control the cooling capacity of said machine.

11. A temperature regulating system according to claim 9, including a solid state control circuit and a servo mechanism coupling said temperature responsive element to said machine to control the cooling capacity of said machine.

12. A temperature regulating system according to claim 10, in which the temperature responsive element is a thermistor.

13. A temperature regulating system according to claim 11, in which the solenoid is a hot gas by-pass valve, and means responsive to a predetermined low load condition in the environment to be regulated to operate said hot gas by-pass valve to correspondingly reduce the temperature controlling capacity of the system.

14. A temperature regulating system for refrigerating apparatus including a cooler, a condenser and a compressor, comprising the combination of a vane member coupled between the cooler and the compressor and a normally closed hot gas by-pass valve coupled between the cooler and the condenser means for simultaneously and directly adjusting the vane member and the valve for controlling the cooling capacity of the apparatus, and means to open said valve when said vane member has reached a predetermined open position.

15. A temperature regulating system according to claim 14 including mechanism to prevent the hot bypass valve from opening during the starting and stopping phases of operation of the system.

16. A temperature regulating system according to claim 15, the combination of means for closing the hot gas bypass valve after the vane member has opened to its maximum extent.

17. A temperature regulating system according to claim 16, including means to maintain the hot gas by-pass valve opening position in relation to the vane member substantially independently of ambient temperature conditions.

18. A temperature regulated air-conditioning system having a refrigerant fed through a cooler, a compressor, a condenser and back to the cooler, including a temperature sensor responding to the temperature of the fluid medium used for air-conditioning, a controllable vane member coupling the cooler to the compressor and a controllable bypass valve coupling the cooler to the condenser for controlling the temperature of the fluid medium used for air-conditioning by controlling the cooling capacity of the system, and means responsive to said sensor for shutting the system down in response to a predetermined decrease in the temperature of the fluid medium below the temperature at which said vane member is at its minimum closed position.

19. A temperature regulated air-conditioning system according to claim 18, in which the temperature responsive means is independent of ambient temperature conditions.

References Cited

UNITED STATES PATENTS

| | | | |
|---|---|---|---|
| 2,888,809 | 6/1959 | Rachfal | 62—217 XR |
| 2,921,446 | 1/1960 | Zulinke | 62—117 |
| 2,955,436 | 10/1960 | Miner | 62—217 XR |
| 2,983,111 | 5/1961 | Miner | 62—217 XR |
| 3,011,322 | 12/1961 | Tanzberger | 62—196 |
| 3,081,604 | 3/1963 | Namisniak | 62—217 XR |
| 3,204,423 | 9/1965 | Resh | 62—217 XR |

MEYER PERLIN, Primary Examiner

U.S. Cl. X.R.

62—117, 217, 226